(12) United States Patent
Johnston et al.

(10) Patent No.: US 9,251,419 B2
(45) Date of Patent: Feb. 2, 2016

(54) AUTOMATED METRIC INFORMATION NETWORK

(71) Applicant: DigitalGlobe, Inc., Longmont, CO (US)

(72) Inventors: Carolyn P. Johnston, Lafayette, CO (US); Ozy Sjahputera, Mead, CO (US); Laurence C. Bleiler, Denver, CO (US); Brett W. Bader, Lyons, CO (US); James Thomas Smith, II, Boulder, CO (US)

(73) Assignee: DIGITALGLOBE, INC., Longmont, CO (US)

( * ) Notice: Subject to any disclaimer, the term of this patent is extended or adjusted under 35 U.S.C. 154(b) by 223 days.

(21) Appl. No.: 13/762,355

(22) Filed: Feb. 7, 2013

(65) Prior Publication Data

US 2014/0219514 A1 Aug. 7, 2014

(51) Int. Cl.
*G06K 9/00* (2006.01)
*G01C 11/06* (2006.01)

(52) U.S. Cl.
CPC ............ *G06K 9/0063* (2013.01); *G01C 11/06* (2013.01)

(58) Field of Classification Search
None
See application file for complete search history.

(56) References Cited

U.S. PATENT DOCUMENTS

| | | | |
|---|---|---|---|
| 6,336,062 B1 | 1/2002 | Yamashita | |
| 6,711,293 B1 | 3/2004 | Lowe | |
| 8,165,401 B2 * | 4/2012 | Funayama et al. | 382/190 |
| 8,200,676 B2 * | 6/2012 | Frank | G06F 17/30241 707/723 |
| 8,260,085 B2 * | 9/2012 | Dolloff | 382/293 |
| 8,923,651 B2 * | 12/2014 | Priddle | G06T 11/60 382/291 |
| 8,938,446 B2 * | 1/2015 | Seefeld et al. | 707/722 |
| 8,949,246 B2 * | 2/2015 | Roe et al. | 707/741 |
| 2008/0052638 A1 * | 2/2008 | Frank et al. | 715/808 |
| 2008/0056538 A1 * | 3/2008 | Frank | G06F 3/0481 382/113 |
| 2008/0059452 A1 * | 3/2008 | Frank | 707/5 |
| 2012/0114229 A1 | 5/2012 | Zhou | |
| 2012/0201466 A1 * | 8/2012 | Funayama et al. | 382/195 |

FOREIGN PATENT DOCUMENTS

| | | |
|---|---|---|
| KR | 10-0924820 B1 | 11/2009 |
| KR | 10-2010-0072665 A | 7/2010 |

OTHER PUBLICATIONS

PCT International Search Report for PC?T/U?S2014/015369, May 23, 2014.

* cited by examiner

*Primary Examiner* — Nancy Bitar
(74) *Attorney, Agent, or Firm* — Robert G. Crouch; Marsh Fischmann & Breyfogle LLP (57) ABSTRACT

A Metric Information Network (MIN) with a plurality of Ground Control Points (GCPs) that are selected in an automated fashion. The GCP selection includes clustering algorithms as compared to prior art pair-wise matching algorithms. Further, the image processing that takes place in identifying interest points, clustering, and selecting tie points to be GCPs is all performed before the MIN is updated. By arranging for the processing to happen in this manner, the processing that is embarrassingly parallel (identifying interest points, clustering, and selecting tie points) can be performed in a distributed fashion across many computers and then the MIN can be updated.

14 Claims, 8 Drawing Sheets

AUTOMATED METRIC INFORMATION NETWORK

BACKGROUND

Figure 1:
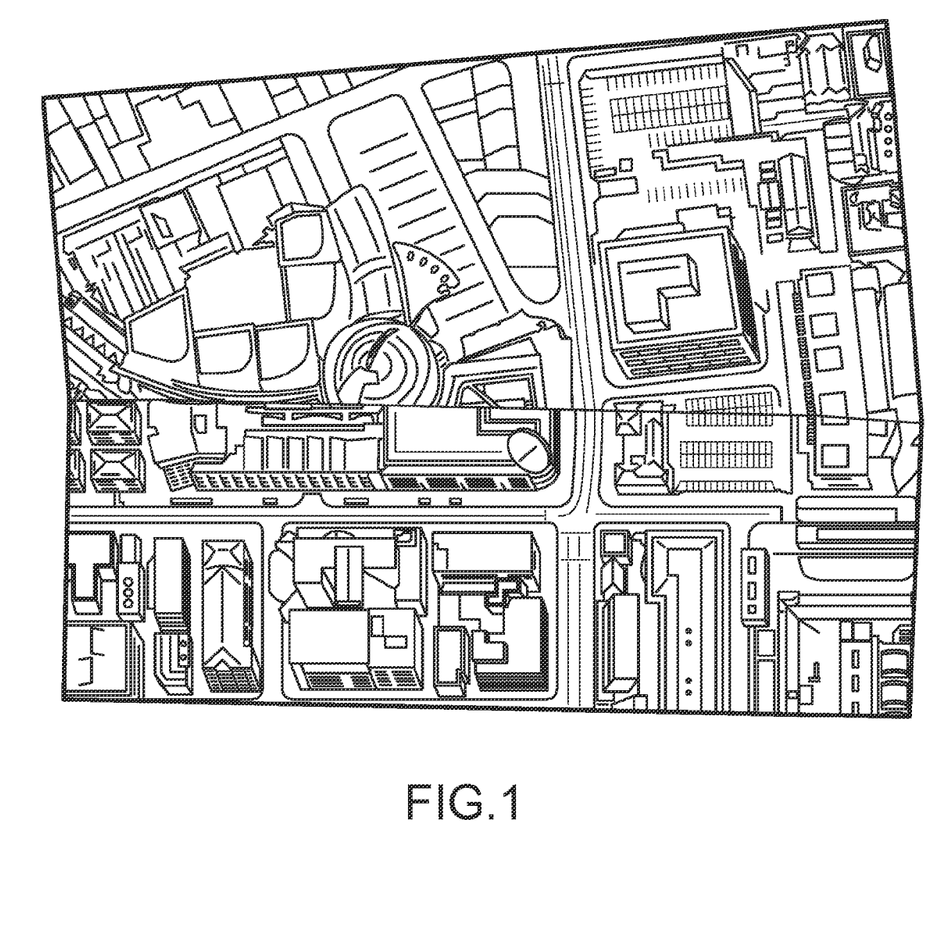
FIG. 1 is an example of a misaligned orthomosaic image.

The use of satellite-based and aerial-based imagery is popular among government and commercial entities. To such entities, it can be useful to piece together thousands of separate images into an orthomosaic image. Unfortunately, because it is not a routine matter to align and orient separate images relative to each other to produce this orthomosaic, misalignment errors are common. Misalignment errors can result in a straight road or edge of a building appearing in the orthomosaic as a road or building edge with a inflection point at the seam between images or in which the road segments in the two different images on either side of the seam do not intersect (see misaligned roads, parking lots, and buildings in FIG. 1).

In order to produce a quality orthomosaic image, a ground control network of a plurality of ground control points (GCPs) can be used. When one or more GCPs can be found in adjacent images, the GCPs can be used to orient the adjacent images so that they are properly aligned. When this is done satisfactorily, it will not be readily apparent that the combined image is a combination of more than one image.

A technique for creating a ground control network is disclosed in Dolloff, J., and M. Iiyama (2007), "Fusion of Image Block Adjustments for the Generation of a Ground Control Network," Proceedings from the Information Fusion, 2007 10th International Conference, Jul. 9-12, 2007 and U.S. Pat. No. 8,260,085 (collectively, "Dolloff"), the entire contents of each of which are incorporated herein by reference. This technique includes creating a ground control network of multiple ground control points (GCPs) from overlapping images generated from aerial and space-borne sensors and measurements of ground points in those images. The process of selecting the GCPs is performed manually and can be labor intensive. In addition, the processing is performed in a serial fashion in Dolloff, which is computationally intensive.

SUMMARY

Disclosed herein is a method of creating a geodetic network, including generating a plurality of ground control points (GCPs) from a set of images where every image in the set overlaps at least a portion of another image in the set, each one of the plurality of GCPs having a geo-coordinate where the GCP is believed to be located and each one of the plurality of GCPs having a error covariance that is believed to exist between that one of the plurality of GCPs and every other GCP, wherein the plurality of GCPs form a geodetic network; receiving additional information about the geo-coordinate of one or more of the GCPs; and after receiving the additional information, updating the geo-coordinate and error covariance of each GCP in the network, wherein the updating is performed without inline image processing.

The method may further include generating one or more additional GCPs, each one of the one or more additional GCPs having a geo-coordinate where the GCP is believed to be located and each one of the one or more additional GCPs having a error covariance that is believed to exist between that one of the one or more additional GCPs and every other GCP. One or more of the GCPs may be identified from an automated tie pointing process. The updating operation may include bundle adjustment. The bundle adjustment may adjust each of the geo-coordinates and generates an error covariance between each of the geo-coordinates. The ground control points may be generated from satellite or aerial images of the ground by an imaging system that can determine the geo-coordinate of locations in the image. The geo-coordinates may be expressed in a three-dimensional coordinate system. The generating operation may include clustering interest points based on geo-location. The generating operation may include comparing interest point descriptors for interest points within each cluster. The generating operation may be performed without human intervention.

Also disclosed is a method of selecting Ground Control Points (GCPs) for a geodetic network. The method includes receiving more than one image of a given area on the ground; detecting interest points in each image and generating an interest point descriptor and a geo-location for each interest point; clustering the interest points based on geo-location to create clusters of interest points; comparing the interest point descriptors for the interest points within each cluster; grouping at least some of the interest points based on the comparison; and selecting certain groups as GCPs.

Each operation may be performed without human intervention. The selecting operation may include performing a deblundering operation to discard groups that are less worthy than others.

Also disclosed is a method for creating, improving, and increasing a ground control network, including providing a set S of overlapping images of the ground in an area of interest; generating ground control points from the collected imagery, including geo-location information about each ground control point; storing image data and geo-location information about each ground control point in a tie point database; and performing a sequential fusion of block adjustments from the tie point database, without performing inline measurement of ground control points into new imagery.

The first time that the block adjustment is performed, the method may include specifying the images from the set S that are to be used in the first block adjustment; using solely the information and data in the tie point database to perform the block adjustment, without the use of any inline image processing, in order to adjust the geo-locations of the ground control points and generate posterior covariances between each of the ground control points; and storing the adjusted ground control point geo-locations, and their posterior covariances, in a ground control network database.

Subsequent times that the block adjustment is performed, the method may include specifying the images to be used in the current block adjustment; using solely the information and data in the tie point database to perform the block adjustment, without the use of any inline image processing, in order to adjust the geo-locations of the ground control points and generate posterior covariances between each of the ground control points; and storing the adjusted ground control point geo-locations, and their posterior covariances, in the ground control network database.

The generating ground control points operation may include collecting image observations from the set S of imagery by first grouping image observations together according to the geographic area in which the observations are found, and then processing the grouped image observations in parallel on one or more computers to find groups of tie points.

BRIEF DESCRIPTION OF THE DRAWINGS

The disclosure herein is described with reference to the following drawings, wherein like reference numbers denote substantially similar elements.

DETAILED DESCRIPTION

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

Orthomosaic production is an important application of the Metric Information Network (MIN) technology. Large orthomosaics produced from satellite or aerial images often contain noticeable misalignment errors at the edges of input scenes, even when the orthomosaic meets absolute accuracy specifications. Misalignment between scenes can be reduced using a MIN defined over the entire region of the orthomosaic.

Figure 2:
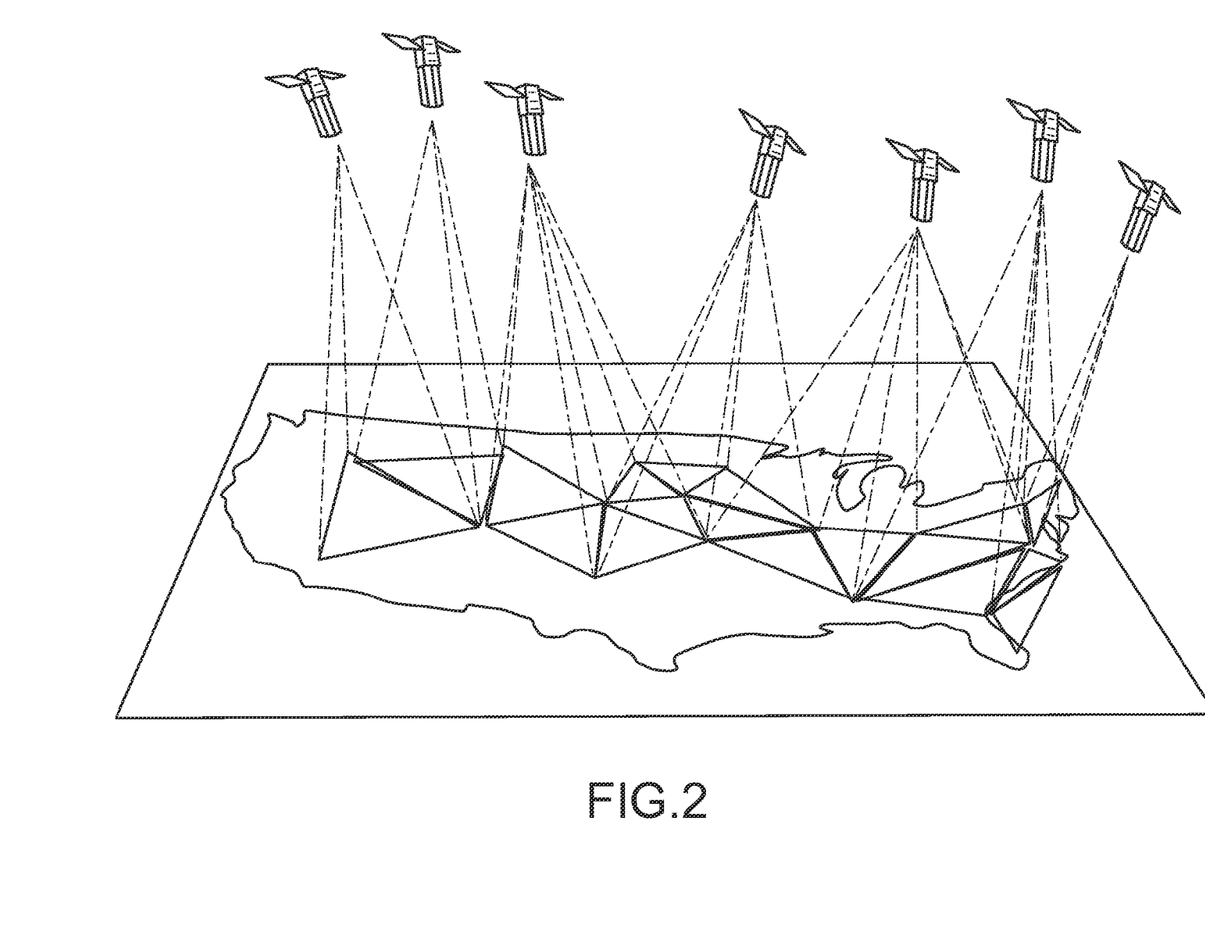
FIG. 2 is an illustration of one or more satellites in different positions above the continental United States, imaging points on the ground that will be connected into a geodetic network. The vertices represent the points themselves, and the edge between two points represents the cross-covariance matrix defining the correlation between the point coordinate errors.

FIG. 2 is a simplified illustration of an imaging satellite (e.g., QuickBird or WorldView-2 owned and operated by DigitalGlobe) at various different times in various different positions above a land mass (in this case North America, where only the continental United States is illustrated). In each position, the satellite is able to obtain ground images. The WorldView satellite instruments are pushbroom electro-optical (EO) sensors that have high pointing accuracies of 3-4 meters on the ground. Panchromatic band ground sample distances (available in commercial imagery) are as small as 0.5 m for the WorldView sensors.

In this overly-simplified example, each vertex represents a Ground Control Point (GCP) in the MIN, and each edge represents the cross-covariance between errors in the two GCPs that it connects. Each GCP will have been observed in two or more images (which are not shown in this diagram), and nearby Ground Control Points are likely to have been observed at least once in the same image. This common origin produces the correlation in coordinate errors that is represented by the cross-covariance matrix. Errors in GCPs that are farther apart are still correlated, but more weakly. The network of GCPs, tied together by their error covariance matrices, is known as a Metric Information Network (MIN).

But first, the MIN has to be created by identifying the GCPs that will be included therein. Initially, at least two images are obtained of an area on the ground, although any larger number of images could be used. They may be a pair of stereo images, but that is not a requirement. In the case of the pair, they may be taken from different points in space (e.g., with a 40-60 degree collection angle between them). For example, an image can be taken of a ground location as the satellite approaches the location and then again after the satellite passes the location.

It should be noted that it is known to reasonable accuracy the locations on the ground where the image was taken and the location above the ground where the satellite was when the image was taken, via information from the satellite's GPS receiver and IMU. These locations can be expressed in earth-centered, earth-fixed (ECF) coordinates of x, y, and z, where the point (0,0,0) is located at the center of mass of the Earth, the x-axis runs through the Greenwich Meridian at the Equator, the y-axis is orthogonal thereto and also runs through the Equator, and the z-axis runs through the North Pole.

Figure 3:
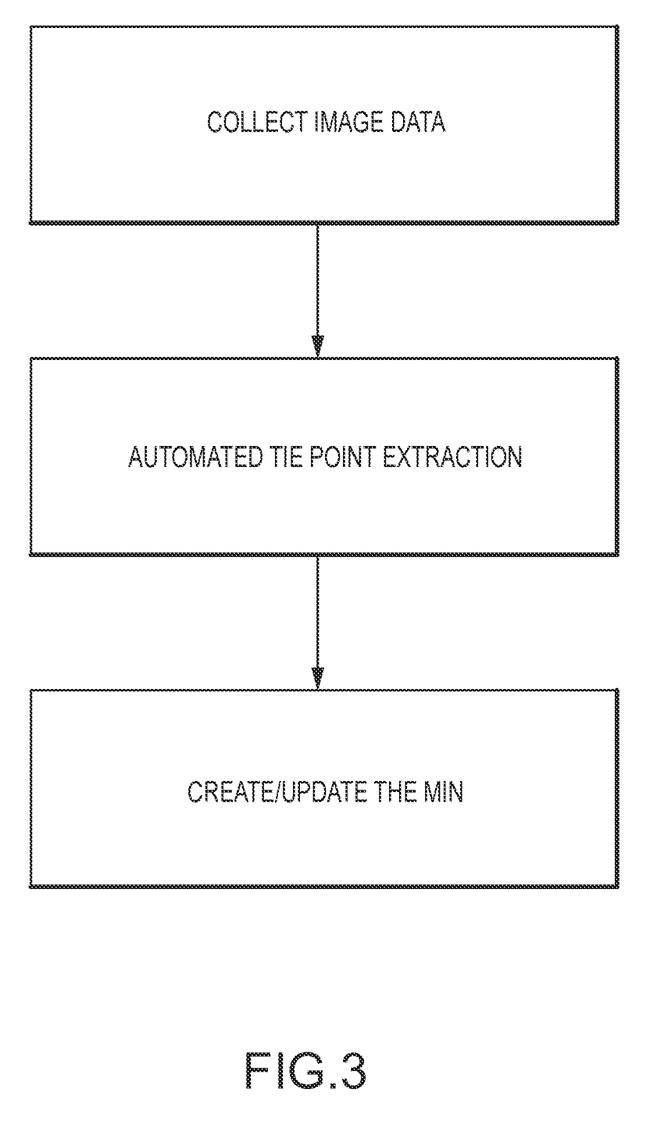
FIG. 3 is a flowchart of the techniques described herein.

FIG. 3 is a simplified flowchart showing the major steps of generating a MIN. First, image data is collected. This may include tasking an imaging satellite to obtain a set of overlapping images of portions of an area of interest (e.g., the landmass of Australia, the island of Sardinia, the country of Italy, and so forth). Alternatively, this may include accessing archived satellite images of the area of interest. Second, the process of Automated Tie Point Extraction is performed. That process includes several component steps that are discussed in further detail below. The objective of that process is to obtain a set of GCPs about which geo-coordinate information has been determined. Third, the process of creating and updating the MIN is performed. As will be understood, these major steps are iteratively performed. In other words, for a given area of interest, image data can all be collected before anything further occurs (or archived image data can be used) or a subset of the image data can be obtained. The tie points are identified and extracted in an automated process that at the same time generates geo-coordinate information about the tie points (which now become GCPs). The initial MIN is then created. Subsequently, additional image data is used to (1) determine additional geo-coordinate information about certain ones of the GCPs; and (2) determine geo-coordinate information about new GCPs to be added to the network.

The ATP subsystem populates the ATP database with high-quality image point observations. High quality, in this case, means that the image points are reproducible, i.e., distinctive and persistent. The MIN update process then draws on the pre-populated ATP database for the image points that will drive the numerical MIN update process.

The separation of the ATP and MIN update subsystems achieves two goals. First, it effectively divides the MIN system into an offline image preprocessing portion and a numerically intensive MIN update system. Second, it allows the image preprocessing portion to run as a massively parallel process.

Figure 4:
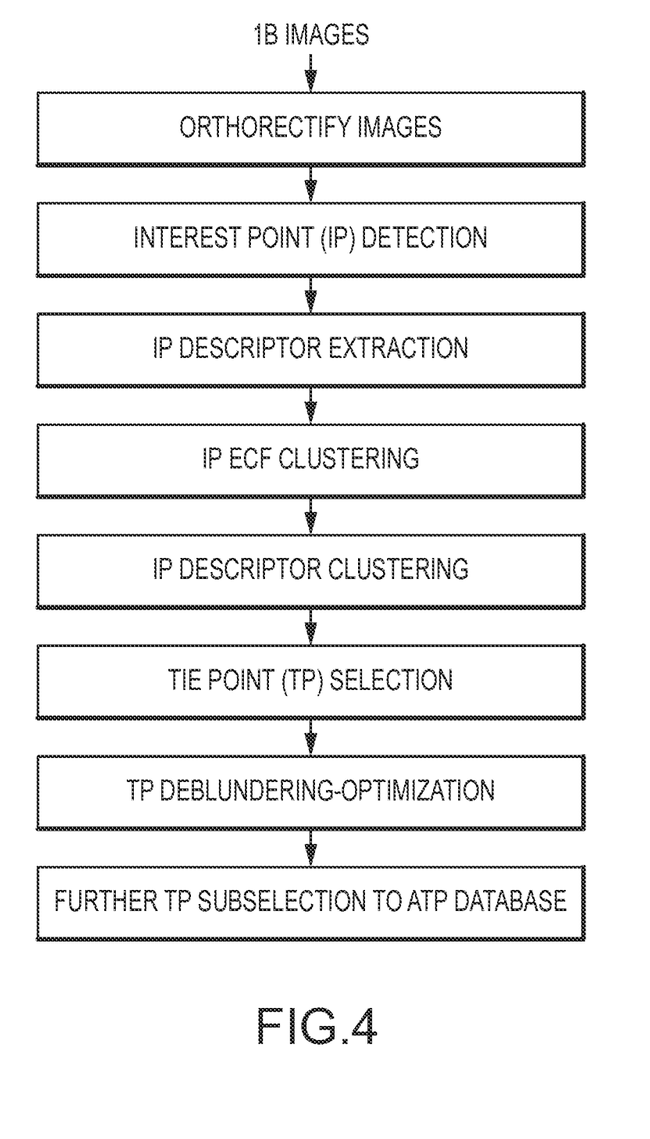
FIG. 4 is a more detailed flowchart of the Automated Tie Point Extraction algorithm.

FIG. 4 shows a pipeline of processes that occur as part of ATP, in the following order:
1. Orthorectification of all images
2. Interest point detector/descriptor extraction
3. Interest point grouping into tie point sets
4. Tie point selection
5. Tie point deblundering/optimization
6. Further tie point subselection to ATP DB (database)

The following includes high-level descriptions of each ATP subprocess, additional details of ATP processing may be the subject of further patent applications.

0. Slightly processed image data (called 1B image data at DigitalGlobe) is used as input to this process, although any suitable type of image data could be used. The primary types of image processing that have already occurred in 1B data are removal of optical distortion, and synthesis of a single linear array from the sensor's offset subarrays. The latter process involves the use of a coarse digital elevation model (DEM). This image processing and all of the processing described below may take place in processing centers on the ground after image data is transmitted down from the satellite. The location of the processing is not a requirement, however, as the processing could potentially be done anywhere.

1. Orthorectification of all images. The constituent images are all orthorectified to a standard DEM, usually SRTM-90, before any further processing is done, using standard methods. This enables interest points to be detected and matched in spite of non-rotational distortions due to different viewing angles in the source 1B images. Orthorectification can take out these distortions, remove distortions due to local terrain changes, and normalize all imagery so that the north direction is at the top of the image. It is also possible to adjust to normalize pixel resolution.

2. Interest point and descriptor extraction. The orthorectified images are each submitted to a program that detects interest points (i.e., potential ground point observations) and extracts their feature vectors (descriptors), using standard methods. Because the location of the satellite is known via its GPS receiver, and the orientation of the satellite is known due to its Inertial Measurement Unit (IMU), the images are tagged with metadata that can be used to later determine the geo-location (on a pixel-by-pixel basis) of objects in the image to within only 4-5 meters on the ground.

Generally, it may be desirable to have tie point sets that are located on the ground (e.g., an intersection of a road) and are not elevated relative to the surrounding ground (e.g., the top of a tree or the top of a building). Because the world is not perfect, sometimes elevated ground points are used. Further, points used are not necessarily man-made. It is preferable to have a tie point that is located on the ground rather than the top of a building or tree, since this reduces the likelihood of a feature being obstructed or missing in future images By eliminating elevation issues, the accuracy of the GC network can be improved. It is also desirable to not use things that grow like a tree, since the tree will look different in future seasons and years. Sometimes, however, there is no other choice than to use non-optimal tie points such as this. One example of a preferred type of tie point may be the corner of an intersection.

An Interest Point (IP) extraction algorithm is used. Although any suitable IP extraction algorithm could be used, two examples of suitable IP extraction algorithms are SIFT (Scale-Invariant Feature Transform) and SURF (Speeded Up Robust Features). SIFT creates a feature vector (a 128-dimensional-vector) for each feature in the image and compares those vectors to vectors generated for objects in a set of reference images. The comparison is made by calculating the Euclidean distance between the feature vector and the vectors from the reference image. SURF also produces a feature vector and was partly inspired by the SIFT vectors but it uses an integer approximation to the determinant of a Hessian blob detector, which reportedly makes the SURF algorithm much faster than the SIFT algorithm. Thus far, it appears that SURF may work faster, give fewer interest points, and be more repeatable. Again, any suitable type of feature vector could be used and there could be a greater or lesser number of dimensions in the feature vector.

The techniques taught herein include using clustering algorithms to determine a point on the ground that is common to two or more different images. This is to be contrasted with the approach of prior art systems that strictly used pair-wise comparison/matching. In other words, if there are five different images ($I_1$, $I_2$, $I_3$, $I_4$, $I_5$) of a single ground region, a pair-wise comparison/matching system would run a comparison of $I_1$ with $I_2$ as well as a comparison of $I_1$ with $I_3$, a comparison of $I_1$ with $I_4$, a comparison of $I_1$ with $I_5$, a comparison of $I_2$ with $I_3$, a comparison of $I_2$ with $I_4$, a comparison of $I_2$ with $I_5$, a comparison of $I_3$ with $I_4$, a comparison $I_3$ with $I_5$, and a comparison of $I_4$ with $I_5$, for a total of ten different comparisons. On the other hand, a clustering algorithm can cluster together any number of images.

3. Interest point grouping into tie point sets. Interest points from different images are clustered into sets of observations based on the similarity of their estimated ground locations. Interest points having similar ground location represent possible observations of the same ground point. The interest point ground location is calculated from the image sensor model using DigitalGlobe's Community Sensor Model (CSM) library. This step leverages the high geolocation accuracy of the WorldView sensors.

At this point, the algorithm can be contrasted with the Dolloff technique where pair-wise comparison/matching is done between pairs of images. In the technique described herein, a hierarchical agglomerative or sequential clustering algorithm is applied to each of the sets of interest points found in the previous step. The clustering algorithm groups all interest points from one image that are found within a given distance (e.g., 10 meters) of the ground location of other interest points in any other image (out of what may be a whole stack of images of a particular area of the ground) into a "cluster" based on the similarity of their interest point descriptors. This makes use of and leverages the high degree of accuracy in the geo-location that is available for each pixel of each image as well as the interest point descriptor. This geo-location accuracy is not present in many other types of image processing, clustering, etc.

4. Tie point selection. We will discard most of the tie point (TP) sets found in the previous step; we will keep only the TP sets that are of highest quality. TP sets are considered to be of high quality if the interest points within them are highly similar based on their geolocation and descriptors, and if they contain a higher number of interest points, as the latter condition implies that the ground point observations are reproducible across images. In this step, TP sets are ranked by a metric based on their intrinsic characteristics. At the end of this step, a predetermined number of the top-ranked TP sets are kept for further processing; the rest are discarded.

As a simple example using the sequential clustering approach, suppose that Image $I_1$ has points $P_1$ and $P_2$ that may be features and Image $I_2$ has points $P_3$ and $P_4$ that may be features, while Image $I_3$ has points $P_5$ and $P_6$ that may be features, and that vector $X_1$, $X_2$, $X_3$, $X_4$, $X_5$, and $X_6$ are the descriptors for these 6 points, respectively. Of course there is no need to compare $P_1$ to $P_2$, or $P_3$ to $P_4$, or $P_5$ to $P_6$, because each of those pairs of points is from the same image. Next the descriptor of $P_1$ is compared to those of $P_3$, $P_4$, $P_5$, and $P_6$. The comparison includes calculating the Euclidean distance (d), such as $d_{13}=\|X_1-X_3\|$. Similarly $d_{14}$, $d_{15}$, and $d_{16}$ are calculated. Note that in this step it is the difference between the multi-dimensional descriptors for two points that is being determined. The ground distance between points was used in the previous step to create the cluster which $P_1$, $P_2$, $P_3$, $P_4$, $P_5$, and $P_6$ are members of the cluster.

The smallest value of d is used to group the two points together into a tie point set. Because we include the constraint that a given cluster cannot contain more than one point from the same image, this is a constrained clustering algorithm. There may be other constraints as well, such as those related to the fact that adjacent or consecutive images that come from the same larger image strip typically have overlapping sections which should be constrained not to contribute matching tie points.

Continuing with the example, it may be determined that $d_{13}$ is the minimum Euclidean distance, so $P_1$ and $P_3$ are grouped together into a tie point set. Then it is determined if $P_5$ or $P_6$ should be added to the set (note that $P_4$ is no longer available since the previous constraint serves to constrains us from adding $P_4$ to the tie point set since $P_4$ and $P_3$ are from the same image). This could be done in any of a number of ways depending on the type of linkage selected. A linkage method is the way a distance between two clusters is calculated. Among linkages available include single linkage (nearest-neighbor or shortest-distance), complete linkage (maximum distance), or average linkage, One example would be to use the average linkage where the distance between current tie point set to $P_5$ and $P_6$ are calculated as the average of the Euclidean distances $d_{15}$ and $d_{35}$ and as the average of $d_{16}$ and $d_{36}$, respectively. If the latter average distance is smaller, then $P_6$ is determined as a better candidate and it is added to the tie point set with $P_1$ and $P_3$. While the other points $P_2$, $P_4$, and $P_5$ cannot be grouped into the same set based on the constraint already discussed, they may possibly be grouped themselves into another tie point set, albeit with lesser descriptor similarity.

Next one can calculate the scatter in each of the tie point sets. The ground location scatter is calculated as the average of all Euclidean distances between any two interest point ground locations in the tie point set. Similarly, the descriptor scatter is calculated as the average of all Euclidean distances between any two interest point descriptors in the tie point set. The tie point sets can be ranked based on how small the scatter is within each set (smaller scatter indicates higher consistency). Each tie point set receives two ranks, each based on the ground location scatter and the descriptor scatter. The final rank of each tie point set is calculated as the aggregate of order statistics given by the two rankings. In addition to feature consistency, it is also important to consider the number of interest points in a tie point set. A larger number of interest points indicates that the ground location represented by the tie point set is more repeatable across images. Therefore, the scatter ranking described previously is performed within groups of tie point sets having the same number of interest points. For a given sub-image (quadkey), we begin our tie point selection with tie point set group with the largest number of interest points. The top-ranked set(s) can then be selected from the group. If the required number of tie point sets is higher than what is available in the first group, the selection process is extended to include the top-ranked tie point sets found in the next group with the second largest number of interest points. The process is repeated until the required number of tie point sets desired is filled. The rest of the sets are discarded. During the selection process, care must be taken to insure that all selected tie point sets do not share any common interest point. This constraint is applied to prevent the same interest point from being used as observations in two different ground points. Since the tie point sets are selected in order of their rank, this constraint can enforced simply by rejecting all tie point sets having common interest points with any of the sets (with higher rank) already selected.

5. Tie point deblundering/optimization. The remaining TP sets are then reviewed for blunders in individual scenes. The (fully automated) review removes and/or adjusts blunder rays in TP sets using standard deblundering methods. Below is a description of a deblundering algorithm.

Tie Point Blunder Detection Based on Ground Residual

Each tie point selected in the previous step is subjected to a blunder detection process based on two criteria: ground residual and correlation. For the ground residual analysis, we begin by calculating the tie point ground location as the least-square solution that minimizes the sum of image residuals from all interest points. The interest point image residual is defined as the distance between the actual interest point location in the image (as found by the interest point detector) and the ground-to-image projection of the tie point ground location. The interest point ground residual is calculated as the distance between the tie point ground location and that of the interest point. Since the least-square solution for the tie point ground location is influenced by the presence of blunder interest points, an iterative process is taken to identify and remove blunder points gradually. Two residual threshold values are utilized: a user defined value and a value calculated using the median value of residual distribution in a given iteration. The use of distribution-based threshold is intended to dampen excessive blunder removal that could happen when the presence of some serious blunder points pulls the tie point ground location further away from the location of good interest points, causing the ground residuals of the good points to increase. An interest point is considered a blunder if its ground residual is larger than both the user defined threshold and the distribution-based threshold at a given iteration. For the following iteration, the tie point ground location is recalculated after removing all blunder points detected in the previous iteration. The iterative process is terminated when no more blunder point is found, or when only two interest points remaining in the tie point set.

Tie Point Blunder Detection Based on Correlation.

Correlation is a common measure used in image matching. Interest points in a tie point set are supposed to be observations of the same ground point. As such, the correlation between any two interest points should be high providing the objects in the area surrounding the ground point remain unchanged during the times when the two images are collected. This pair-wise correlation assessment is extended by considering all possible interest point pairs involving a specific interest point. The average of correlation values from these pairs is used to measure the overall correlation fitness of an interest point within the tie point. This correlation fitness is calculated for each interest point in the tie point. Next, an iterative process is employed to find blunder interest point(s) identified by low correlation fitness. Two correlation threshold values are used: user defined value and a value calculated using the median of the correlation fitness distribution in a given iteration. The use of distribution-based threshold is intended to dampen excessive blunder removal that could occur when the presence of some serious blunder points produce low correlation values when assessed against the good points, causing the correlation fitness of the good points to decrease. An interest point is considered a blunder if its correlation fitness is less than both the user defined threshold and the distribution-based threshold at a given iteration. For the following iteration, the correlation fitness of each interest point is recalculated after first removing all blunder points detected in the previous iteration. The iterative process is terminated when no more blunder point is found, or when only two interest points remaining in the tie point set.

Tie point blunder detection based on ground residual and correlation analysis. The iterative processes for ground residual-based and correlation-based blunder detection explained previously are combined to create a more stringent tie point blunder detection process. For a given iteration, all remaining interest points in the tie point set are subjected to both blunder detection criteria. An interest point is considered a blunder if it fails to satisfy at least one of the two criteria.

Correlation-based tie point optimization. Let $\hat{P}=\{I_1, \ldots, I_j, \ldots, I_D\}$ be a tie point after blunder removal. Our objective now is to adjust the location of each interest point in a tie point to maximize the overall correlation measures calculated from all interest point pairs. An interest point pair is denoted as $(I_k, I_t)$ where $I_k$ defines the kernel image and $I_t$ defines the target area in another image where a matching to $I_k$ may be found. Here, $I_k$ and $I_t$ are image points found in different image strips. Next, we extract a square image chip centered on the location of interest point $I_k$ and $I_t$. Given a certain search radius, we calculate the correlation map $M_{kt}$ for interest point pair $(I_k, I_t)$ where a matrix component $M_{kt}(x,y)$ contains the normalized cross-correlation (NCC) value between the two image chips with the offset (x,y) from the origin. The location of peak correlation value found in $M_{kt}$ is associated with the location of image chip from $I_t$ that best matches the kernel image chip from $I_k$, i.e. the offset of the peak location in $M_{kt}$ indicates where we should move $I_t$ to maximize its correlation matching to $I_k$. This represents a traditional use of NCC for point matching used widely in image processing. However, the traditional NCC-based matching requires us to consider two points at a time where we must designate the points as either the kernel or target point. Here, we consider all interest points in a tiepoint equally and we iteratively adjust their locations simultaneously to maximize the overall correlation measure within the tiepoint.

Aggregate correlation map of an interest point. The traditional pair-wise NCC matching that produces the correlation map $M_{kt}$ for an interest point pair $(I_k, I_t)$ is utilized as the basic building block of the new approach. Taking interest point as a target and all other interest points as kernels, we calculate their correlation maps $M_{kt}$ where k≠j. We then calculate the aggregated correlation map for denoted as $\overline{M}_j$ by summing up all the pair-wise correlation maps $M_{kj}$ and normalizing the sum. The component $\overline{M}_j(x,y)$ contains the expected value of normalized correlation of the target interest point $I_j$ at location offset (x,y) with all the other interest points serving as the template kernels. Therefore, if $\overline{M}_j(x_p, y_p)$ is the peak correlation in $\overline{M}_j$, then applying the offset $(x_p, y_p)$ to the current location $I_j$ of will maximize its overall normalized correlation with respect to the other interest points. The peak correlation for interest point is then denoted as $corr(I_j) = \max(\overline{M}_j)$.

Tie point internal correlation metric. We calculate the tie point internal correlation $corr(\hat{P})$ as the average of all peak correlation value $corr(I_j)$ from all interest points in $\hat{P}$. This metric represents how well the interest points correlate to one another within a tiepoint. Users can set the minimum acceptable value for $corr(\hat{P})$ in threshold $T_{corr}$. Tiepoints with internal correlation metric less than $T_{corr}$ is rejected.

Iterative tie point optimization algorithm. Using the alternating-optimization approach, we use the tie point internal correlation metric as defined previously to build an iterative tiepoint optimization algorithm with the following stopping criteria: (1) Maximum number of iteration is met, or (2) the change in $corr(\hat{P})$ in two consecutive iterations is no larger than the threshold ($\delta_{corr}$), or (3) the average change in ground location of interest points in two consecutive iterations is no larger than threshold ($\delta_{ground}$). The algorithm pseudo-code is given below:

Iterative optimization algorithm for tie point with 3 or more interest points. Consider a tiepoint with D interest points, $\hat{P}=\{I_1, \ldots, I_j, \ldots, I_D\}$ where $E_j=(x_j, y_j, z_j)$ is the ground location of interest point $I_j$.

Let user to specify the minimum acceptable tiepoint internal correlation ($T_{corr}$), search radius r, and chip size s.
Set the iteration index l=0.
Calculate the initial internal tiepoint correlation for $\hat{P}$ as $$corr_{(0)}(\hat{P}) = \frac{1}{D}\sum_{j=1}^{D} c_j$$

with chip size s; $c_j$ is the correlation metric for interest point $I_j$ where $$c_j = \frac{1}{N-1}\sum_{k=1;k\neq j}^{N} NCC(I_j, I_k, s),$$

and $NCC(I_j, I_k, s)$, is the normalized cross-correlation between image chips centered on $I_j$ and $I_k$, respectively, for a given chip size s.
DO
Update l=l+1
  FOR each interest point $I_j \in \hat{P}$ DO
    Calculate the aggregate correlation map $\overline{M}_j$ using search radius r and chip size s.
    Find the peak correlation $corr_{(l)}(I_j) = \max(\overline{M}_j)$ and the corresponding peak location $(x_p, y_p)$.
    Calculate the updated ground location $E_j^{(l)}$ of $I_j$ applying the UTM offset associated with peak location $(x_p, y_p)$ to $E_j^{(l-1)}$.
  END-FOR
  Calculate the internal tiepoint correlation metric $corr_{(l)}(\hat{P})$.
  Calculate the change in internal correlation metric, $\Delta_{corr} = corr_{(l)}(\hat{P}) - corr_{(l-1)}(\hat{P})$.
  Calculate the shift in ground location, $$\Delta_{ground} = \frac{1}{D}\sum_{j=1}^{D} \|E_j^{(l)} - E_j^{(l-1)}\|_2.$$

UNTIL l reaches maximum iteration limit OR ($\Delta_{corr} \leq \delta_{corr}$ AND $\Delta_{ground} \leq \delta_{ground}$) IF $corr_{(l)}(\hat{P}) < T_{corr}$ THEN
  Reject tiepoint $\hat{P}$.
ELSE
  Assign the last updated ground location $E_j^{(l)}$ as the optimized ground location for interest point $I_j$ for subsequent processes.
  Propagate $E_j^{(l)}$ to all other coordinate systems (1B line/sample, geographic, and UTM).
  Recalculate the tiepoint ground location using least-square optimization by minimizing the sum of image residuals from the interest points image locations.
  Return the optimized tiepoint as $\tilde{P}$.
END-IF
Optimization algorithm for tie point with 2 interest points. Consider a tiepoint with 2 interest points, $\hat{P}=\{I_1, I_2\}$, where $\{E_1, E_2\}$ are the interest point ground locations.
Let user to specify the minimum acceptable tiepoint internal correlation ($T_{corr}$), search radius r, and chip size s.
Calculate the correlation map $\overline{M}_1$ and $\overline{M}_2$ using search radius r and chip size s.
Find the peak correlation $corr(I_1) = \max(\overline{M}_1)$ and $corr(I_2) = \max(\overline{M}_2)$.
Find i=arg max($corr(I_1), corr(I_2)$).

Calculate the optimized ground location $E_i$ of $I_i$ by applying the UTM offset associated with peak location found in $\overline{M}_i$.
IF corr($I_i$)<$T_{corr}$ THEN
 Reject tiepoint $\hat{P}$.
ELSE
 Propagate the optimized $E_i$ to all other coordinate systems (1B line/sample, geographic, and UTM).
 Recalculate the tiepoint ground location using least-square optimization by minimizing the sum of image residuals from the interest points image locations.
 Return the optimized tiepoint as $\tilde{P}$.
END-IF Blunder point correction using optimized tie point. After having identified the blunder interest points, removed them from the tie point, and optimized the remaining interest points, we now attempt to apply some corrective adjustments to these blunder points using the optimized interest points in $\tilde{P}$ as templates to match. TWe try to improve the correlation of the blunder points to the optimized interest points. If the attempt is successful then the corrected blunder could be reintegrated to $\tilde{P}$ creating an optimized and corrected tiepoint denoted as $\overline{P}$. This allows us to increase the number of interest points (observations) in a tie point. Using a given search radius and image chip size, we calculate the average correlation map for each blunder point $b_i$ as $$\overline{M}_i = \frac{1}{|\tilde{P}|} \sum_{I_j \in \tilde{P}} M_{ij}.$$

$M_{ij}$ is a correlation map produced by calculating the NCC with the blunder point $b_i$ as target and the optimized point $I_j$ as the kernel. The peak location in $M_{ij}$ indicates where $b_i$ should be located in order to obtain the highest correlation with $I_j$. In other words, $M_{ij}$ contains the potential solution for correcting the blunder point $b_i$ from the perspective of the optimized point $I_j$. Therefore, $\overline{M}_i$ is the aggregation of all potential solutions from the optimized interest points in $\tilde{P}$. The location of maximum correlation in $\overline{M}_i$ is regarded as the new location for blunder point $b_i$ that maximizes its overall correlation with all the optimized interest points in $\tilde{P}$. The maximum value in $\overline{M}_i$ can be construed as the quality metric of the solution. Since $\overline{M}_i$ is a correlation map calculated using NCC, therefore max($\overline{M}_i$) is bounded in [0,1.0]. A simple threshold value could be used to determine whether the corrected blunder point is good enough for addition to $\tilde{P}$.

Multi-level blunder correction algorithm. Since we are dealing with blunder points, it might be necessary to use a larger search radius. However, large search radius could introduce false positive solution, especially if similar ground points are available in the area. Other factors that could pose additional challenges in blunder correction are land cover changes, seasonal difference, extreme difference in satellite geometry, sun azimuth and elevation (producing shadow variations), terrain, and elevated ground objects not adequately modeled by the elevation data (e.g. buildings which could introduce building lean effects, etc.). These factors and combinations thereof could lower the correlation between different image observation points of the same ground point which increases the risk of finding false positive solution. To mitigate these problems we introduce a multi-level blunder correction process where we employ a gradually decreasing search radius and image chip size. At each level, the correction for a blunder point is calculated in the forms of location offset and the maximum correlation value attached to the location offset. The blunder point location is updated if the correlation value of the solution satisfies a threshold. This updated location becomes the initial location for the blunder point in the next level of correction process. Since the image chip size decreases, we increase the correlation threshold creating increasingly stringent solution criteria as we proceed to the next level of blunder correction. The increasingly stringent quality requirement is necessary to minimize the risk of introducing yet another blunder point into an otherwise blunder-free and optimized tiepoint. The algorithm pseudo code is given as follows:

Let $b_i \in B$ be a blunder interest point with initial ground location $E_i = (x_i, y_i, z_i)$.
Let $\tilde{P} = \{I_1, \ldots, I_j, \ldots, I_D\}$ be an optimized tiepoint.
Let $\{r_l, s_l, \tau_l\}$ be a set of search radius, chip size, and minimum correlation threshold to be used at level-k of the blunder correction where $1 \leq l \leq L$ and L is the number of blunder correction levels. Note that $r_l < r_{l-1}$, $s_l < s_{l-1}$, and $\tau_l > \tau_{l-1}$.
Set level index l=1.
Initialize ground location $E_i^l = E_i$.
DO
 Using $\{r_l, s_l, \tau_l\}$ and $E_i^l$, calculate the average correlation map for blunder point $b_i$, $$\overline{M}_i = \frac{1}{|\tilde{P}|} \sum_{I_j \in \tilde{P}} M_{ij}.$$

Find the peak correlation corr$_l$($b_i$)=max($\overline{M}_i$) and the associated peak location ($x_l, y_l$).
 Calculate the next ground location $E_i^{l+1}$ using the offset learned from the location of correlation peak in ($x_l, y_l$).
 Update l=l+1.
WHILE $l \leq L$ AND corr$_l$($b_i$)$\geq \tau_l$
IF l=L AND corr$_L$($b_i$)$\geq \tau_L$ THEN
 Assign $E_i^l$ as the ground location for interest point $b_i$ and update its location in other coordinate systems.
 Add $b_i$ to $\tilde{P}$ to create an optimized and (blunder) corrected tiepoint denoted as $\overline{P}$.
ELSE
 Blunder correction for $b_i$ is not successful. Discard $b_i$ permanently.
END-IF Tie point augmentation. Let $\tilde{P} = \{I_1, \ldots, I_j, \ldots, I_D\}$ be a tiepoint whose members comprised of optimized interest points. The last step of our tie point processing is to find extra interest points (observations) from images whose footprints overlap the ground location of $\tilde{P}$ but not contributing any interest point in the initial tie point $P = \{I_1, \ldots, I_i, \ldots, I_N\}$ (images that contribute blunder interest points are not considered). For such image, we create a new interest point at the location corresponding to the ground location of the optimized tie point $\tilde{P}$. We do not use the ground location of $\overline{P}$, which contains corrected blunder points in addition to the optimized interest points, to prevent any badly corrected blunder points from influencing the search for new interest points. Let a be a candidate interest point created in a new image with ground location set to $E_{\tilde{P}} = (x_{\tilde{P}}, y_{\tilde{P}}, z_{\tilde{P}})$ which is the ground location of the optimized tiepoint $\tilde{P}$ calculated using the least-square method that minimizes the sum of image residuals from the interest points. We use the same algorithm for blunder correction given previously with the candidate interest point a in place of blunder point $b_i$. If a passes the multi-level process, then it is added to $\overline{P}$ (whose members comprised of optimized interest points and successfully corrected blunder points) to form an augmented tiepoint denoted as $\overline{P}$. Once all new interest points are found and added to $\overline{P}$, we then update the ground location of $\overline{P}$ using the data from all interest points. This ground location will be used as the prior ground location for the tiepoint in the MIN update calculation. The tiepoint $\overline{P}$ is the final product of the ATP pipeline that will populate the ATP database to support the MIN creation and/or update. $\overline{P}$ is maximized both in terms of its internal correlation and also in terms of containing all possible image observations for a given quality standard.

By way of example, one exercise involved 1,231 different images being analyzed, from which over 733 million interest points were generated, creating 191 million ECR-based clusters of interest points. Further descriptor based clustering running on each of the ECR-based clusters produced 233,412,594 tie point candidates. By selecting the best 50 tie point candidates from each quadkey, we reduced the number of tie point candidates to 860,605. Finally, we selected 4,686 tie points that have been deblundered, optimized, corrected, and augmented. These tie points provide a distributed coverage of one tie point for every twenty square kilometers. Our system is flexible enough to generate tie points coverage at different density to select enough tie points to create a MIN across and entire landmass.

6. Further tie point subselection to an ATP DB. The final selection of tie point sets to be used in the MIN depends on the desired density of tie points. At this stage, we downsample the tie points in the interim database so that we are keeping only 1 tie point per 4 quadkeys (1 per 16 km$^2$), the one with the most rays. The term 'quadkey' refers to level 14 quadkeys in the Bing Maps Tiling System, each of which has an area of roughly 4 km$^2$.

Figure 5:
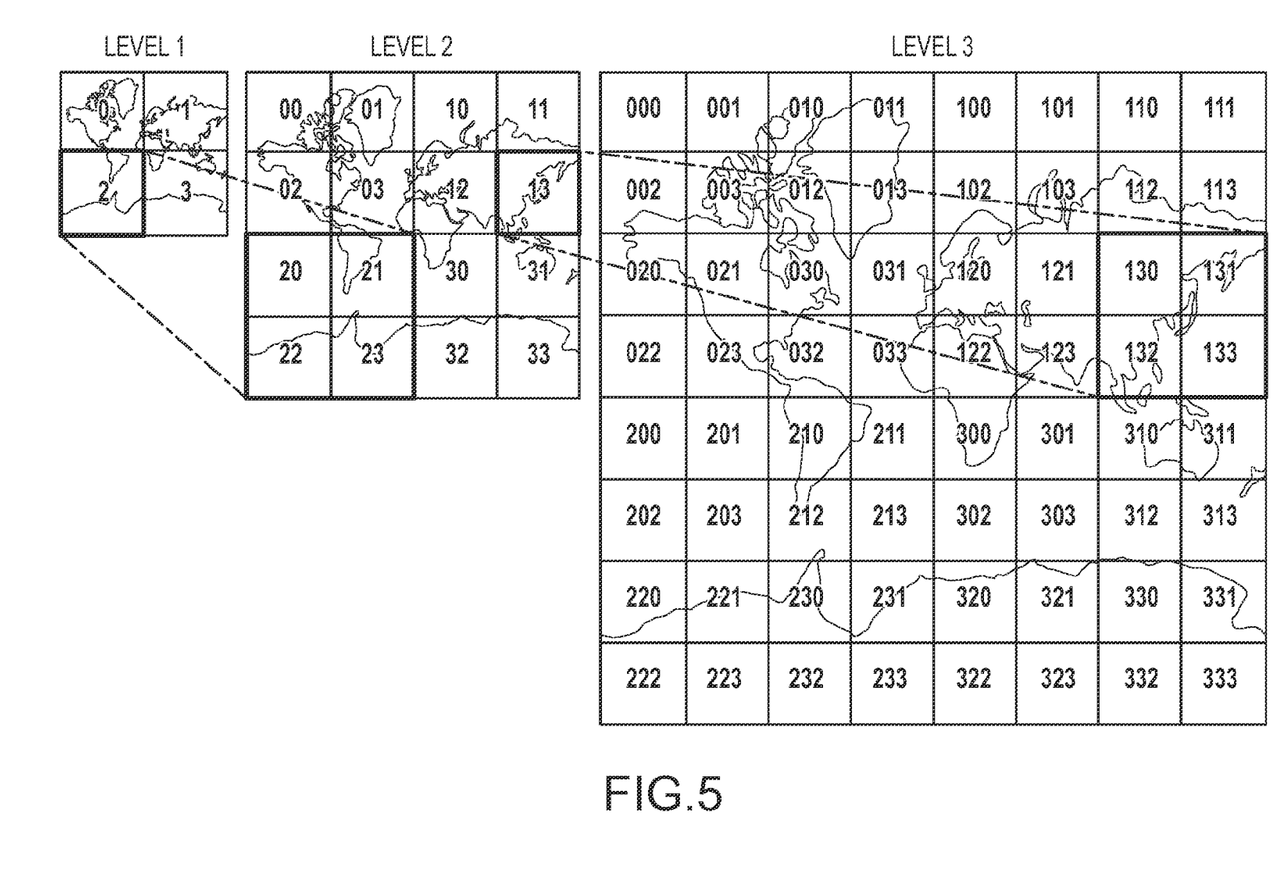
FIG. 5 is an illustration of quad keys used for identifying tiles of a map or image.

Quadkeys are illustrated in FIG. 5. In this case, only Levels 1, 2, and 3 are illustrated. Quadkeys are a technique for identifying tiles or portions of a map or view of the Earth's surface. Quadkeys have several interesting properties. First, the length of a quadkey (the number of digits) equals the level of detail of the corresponding tile. Second, the quadkey of any tile starts with the quadkey of its parent tile (the containing tile at the previous level). As shown in FIG. 5, tile 2 is the parent of tiles 20 through 23, and tile 13 is the parent of tiles 130 through 133. Finally, quadkeys provide a one-dimensional index key that usually preserves the proximity of tiles in XY space. In other words, two tiles that have nearby XY coordinates usually have quadkeys that are relatively close together. This is important for optimizing database performance, because neighboring tiles are usually requested in groups, and it may be desirable to keep those tiles on the same disk blocks, in order to minimize the number of disk reads.

A Metric Information Network (MIN), a system for the generation of an extensive ground control point network from aerial or satellite imagery, is introduced by Dolloff, referenced above. The term 'MIN' is used to describe both the system for generating the ground control point (GCP) network, and the GCP network itself.

A MIN has high absolute accuracy and is internally consistent, i.e., has high relative accuracy. It is constructed sequentially from a series of typical block adjustments (a/k/a bundle adjustments), each using tie points extracted from statistically independent sets of input imagery. Each block adjustment is followed by a fusion step (the Stage 2 MIN update, see Dolloff) that incorporates the newly added information consistently into the existing MIN. The resulting geodetic network is (roughly) equivalent to the GCP network that would be constructed from a batch bundle adjustment using equivalent inputs; however, a MIN is built incrementally, and may cover an extremely large area.

A MIN may utilize images from multiple sensors for its input observations. Each additional independent observation of a given GCP reduces the statistical error in the associated object point location. Externally surveyed GCPs can be incorporated into a MIN in a consistent way, thereby improving the absolute accuracy of the MIN.

MIN GCPs have correlated errors, as do object points resulting from a batch bundle adjustment, and their posterior cross-covariances can be derived as a by-product of the MIN process. Cross-covariances between points are stored in the MIN database, and are used in every Stage 2 update to maintain the high relative accuracy of the GCP network. Tie point image chips (i.e., smaller subimages centered on GCP observations) derived from input images are also stored in the MIN database, and can be used to identify GCPs in new imagery either manually or automatically.

As a first step in the MIN process, MIN GCP observations are identified in the input imagery to the orthomosaic, using automated or manual tie point matching between the MIN GCP chips and the input images. The input images are then block adjusted, using the MIN observations, and the adjusted imagery is used to build the orthomosaic. The orthomosaic will then display the higher relative accuracy of the GCP network across image boundaries. Together with automated technology for image source selection, the MIN enables the automatic production of an orthomosaic that is geographically seamless.

We have built a High-Performance Computing (HPC) MIN implementation that is designed to take advantage of DigitalGlobe's large archive of WorldView-1 and WorldView-2 satellite imagery. The MIN algorithm can be derived as a special case of the sequential least squares algorithm (Mikhail, E. and F Ackerman, Observations and Least Squares. University Press of America, 1982, the contents of which are incorporated herein by reference).

Each MIN update includes the following two stages:

1. Stage 1. A standard non-linear least squares block adjustment of the new image set. Image observations in the new image set may include observations of new tie points, and/or observations of existing MIN GCPs in the new imagery. New tie points are treated in the usual way by the block triangulation, and new observations of MIN GCPs are incorporated, together with the MIN GCP prior coordinates and covariances. It is new observations of existing MIN points that tie the new points into the existing MIN network, and new tie point observations that extend the geodetic network.

2. Stage 2. A 'fusion' step, in which the information from the new block adjustment is correctly incorporated into the existing MIN. The fusion algorithm utilizes the GCP posterior covariances for points involved in the step 1 block adjustment to correctly adjust the coordinates and covariances for the MIN GCPs that were not included in the block adjustment, resulting in the maintenance of a consistent geodetic network after every MIN update.

Before each Stage 1 block adjustment, observations of new tie points and existing MIN GCPs must be identified in the new input imagery. In Dolloff, this identification was human-driven using the Socet Set Adaptive Tie-point Matcher (ATM) program, together with operator review and potential adjustment. ATM for both tie point identification and GCP chip matching was run on new images before each Stage 1 update, so that the image processing component of MIN processing was performed in-line with all the MIN updates.

If a great deal of imagery is available to be processed up front (as is the case with the WorldView archive of Digital- Globe), then the entire image processing component of MIN processing can be completely decoupled from the MIN update component. This is an advantage because tie point identification can be a data-parallel process, whereas MIN updates are necessarily sequential. This is a key feature of the HPC system described herein.

Figure 6:
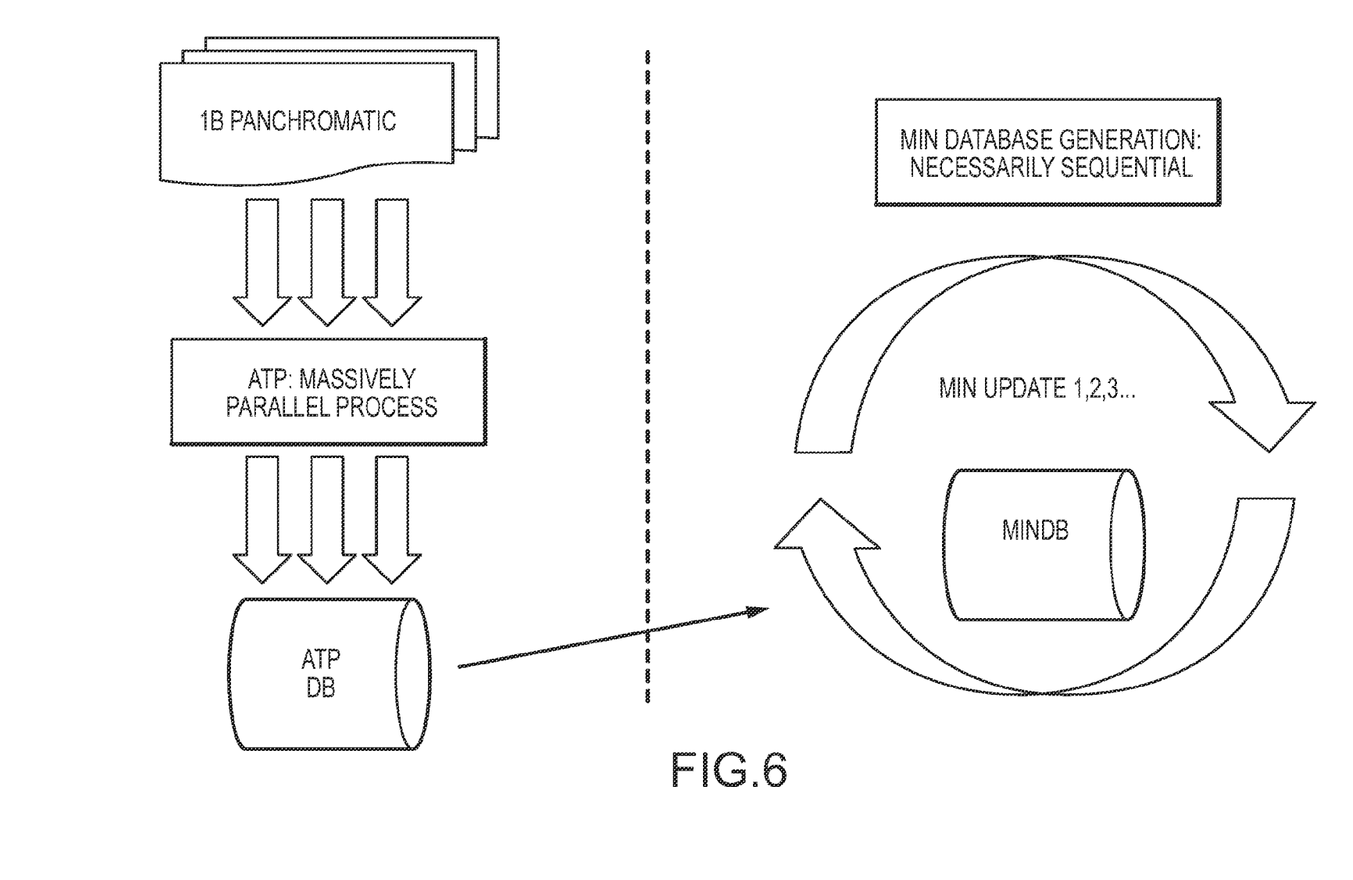
FIG. 6 is an illustration of the High-Performance Computing ATP and MIN architecture.

FIG. 6 shows the high-level architecture of the HPC MIN system. The image processing component of the HPC MIN is called the Automatic Tie pointing Process, or ATP (and has already been discussed in detail above). The ATP extracts image observations of MIN GCPs from large collections of images, and saves the observations (together with data about which images are used, and which object points are referenced) to a database, the ATP DB. The sequential MIN update process draws on the ATP DB for image point observations and image information as the MIN updates are performed.

The ATP extraction process is "embarrassingly parallel". After interest points are identified in individual images, their planimetric locations are known to within meters, so that potentially matching interest points can be analyzed and grouped in smaller subprocesses. These subprocesses are independent, and can be spread across a cluster without the need for communication between nodes.

A MIN update algorithm is described in detail in Dolloff. In the MIN update in the methods described herein, all its inputs are drawn from the ATP and MIN DBs; no image processing is done during a MIN update, as it is all confined to the ATP subsystem. Each MIN update is defined by specifying which images are to be added to the MIN inputs during the update.

Figure 7:
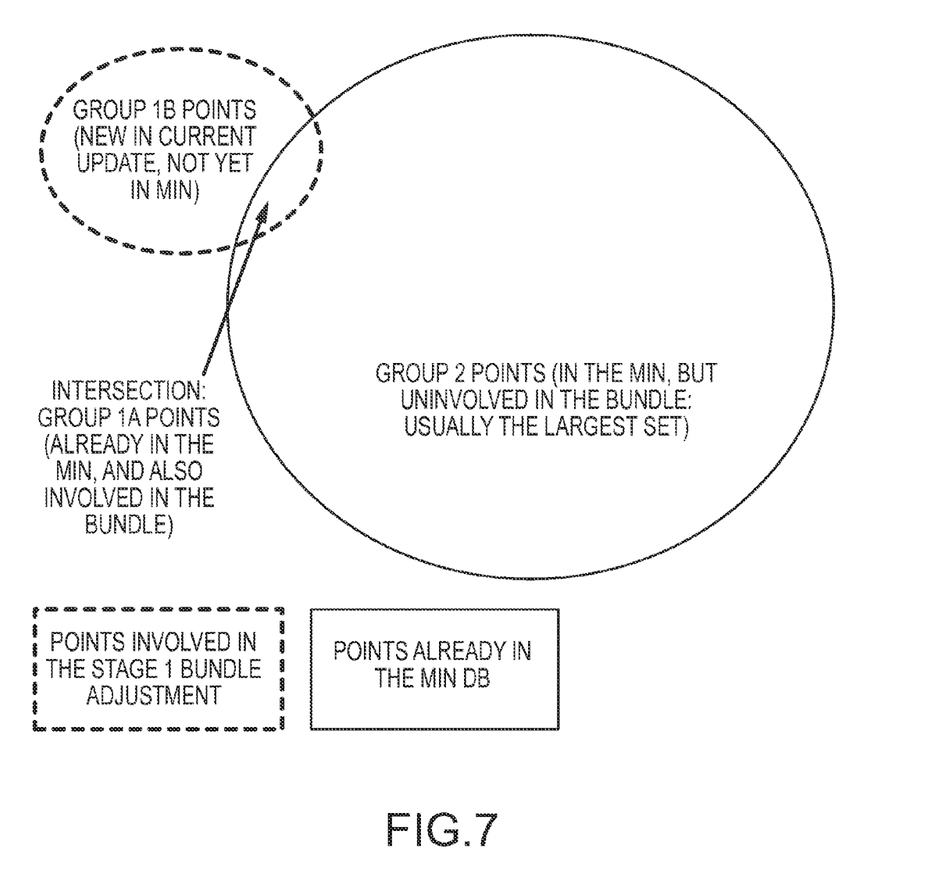
FIG. 7 is an illustration of points already in and points being added to the MIN database.

Stage 1: All image point observations associated with the specified imagery are already resident in the ATP database, and all are pulled for inclusion in the Stage 1 block adjustment input. As shown in FIG. 7, this will include additional observations of object points already represented in the MIN DB (called Group 1a points), and observations of new object points not yet introduced to the MIN DB (Group 1b points). Object points in the MIN that are not observed in the current image set are called Group 2 points. As the MIN grows larger, Group 2 points will outnumber Group 1a and 1b points on every update.

If an image is to be included in an update, all other correlated images must be included as well; therefore, image sets for MIN updates are unions of complete correlated image sets. As a rule of thumb, WorldView-1 images from the same revolution are considered to have correlated errors, and a priori cross-covariances between correlated image parameters are modeled in the bundle adjustment. Cross-covariances between parameters from different images decay with the time separation between images, and are modeled so that the resulting a priori image covariance matrix remains positive definite.

The Stage 1 block adjustment is a standard nonlinear least squares solver using the Levenberg-Marquardt nonlinear optimization algorithm. The DigitalGlobe Community Sensor Model (CSM) for WV01 is integrated into DigitalGlobe's bundle adjustment implementation, and provides the WorldView sensor models (i.e., image-to-ground, ground-to-image, and derivative calculations). Note that the WV01 CSM, which was developed at DigitalGlobe, is distinct from the sensor model for WV01 used in BAE's Socet Set software. Our CSM-based implementation of bundle adjustment takes advantage of the sparsity of the normal matrix, and uses the reduced camera system approach to solving the normal equation, in a manner similar to that implemented in the open source Sparse Bundle Adjustment (SBA) package (e.g., a package is available in C/C++). However, the SBA assumes that all object points and camera parameters are a priori uncorrelated. This is a typical assumption in standard block adjustment problems, and it results in a very sparse normal matrix. The MIN algorithm, however, requires that points included in the Stage 1 block adjustment be modeled with their cross-covariances. In addition, the block adjustment must also model image pairs having correlated errors. Correlated sets of parameters, whether they are object point or image parameters, give rise to larger diagonal blocks in the normal matrix for the Stage 1 block adjustment. The MIN's block adjustment implementation therefore must adapt to the problem. In cases where there are no correlated parameter sets in the input data, the algorithm is equivalent to the SBA algorithm and therefore is very efficient; but it can also treat larger blocks in the normal matrix as block components of a sparse problem.

There were some differences between the DG and Socet Set bundle adjustments for this experiment. BAE allowed adjustments in 6 sensor model parameters, $0^{th}$- and $1^{st}$-order roll, pitch and yaw; DG allowed adjustments in 5 sensor model parameters, $0^{th}$-order roll, pitch, and yaw, and $1^{st}$-order roll and pitch. Socet Set's default prior standard deviations for all $30^{th}$-order attitude parameters were 5 μrads; the DG bundle adjustment used 2 μrads for $0^{th}$-order roll and pitch, and 4 μrads for yaw.

The Stage 1 process is a full photogrammetric block adjustment, in that it outputs not only the modified point coordinates, but also portions of the posterior covariance matrix of the block adjustment. Specifically, all image-to-image and point-to-point components of the posterior covariance matrix are calculated; the image-to-point components of the posterior covariance matrix are expensive to calculate and are only needed for diagnostic purposes, so they are not routinely calculated. The posterior point-to-point covariance blocks from the block adjustment are included in the MIN DB as part of the current MIN update; the Stage 2 step is needed in order to keep the rest of the MIN point coordinates, and their covariances, consistent with the new MIN update.

Stage 2. After the Stage 1 MIN update, the posterior coordinates and cross-covariance blocks are calculated for point groups 1a and 1b. However, coordinates and covariances of points in group 2 are also affected by the information captured in the new MIN update (refer to FIG. 7 for definitions of the point groups). Coordinates of points in group 2 will change slightly, and cross-covariance blocks 1a-2, 1b-2, and 2-2 must be updated (or in the case of 1b-2, initially defined). This update involves computing the inverse of the 1a-1a block of the posterior covariance matrix from the Stage 1 MIN update, and performing a series of large matrix multiplications involving the components of the posterior and prior covariance matrices. Mathematical details of the MIN Stage 2 algorithm may be found in Dolloff.

The computational expense of MIN Stage 2 changes with the sizes of the various point groups. As the MIN grows in size after multiple block updates, the largest, most expensive calculation in the MIN update will eventually be the posterior covariance matrix of block 2-2, P22. The calculation time is $O(m^2 n)$, where m is the number of group 2 points and n is the number of 1a points. Storage of this matrix is $O(m^2)$, so file I/O involving this matrix can be a limiting factor. An experimental MIN over Denver, Colo. north to Cheyenne, Wyo. with only 8300 points, for example, produced a 4.2 GB binary covariance matrix file (even with the space savings due to storing only the upper triangular portions of the symmetric matrix).

Most of the computational burden of the MIN, therefore, comes from the need to store and manipulate large covariance matrix blocks when the MIN grows large. Our Stage 2 algorithm therefore makes use of standard methods for distributed, large-scale matrix multiplication using MPI.

Our first implementation of the Stage 2 fusion algorithm was heavily multithreaded on a single machine and therefore limited by the amount of RAM on the node. Even on machines with 256 GB RAM, our potential MIN sizes were limited to approximately 50,000 points. We therefore have implemented a distributed parallel version of the Stage 2 algorithm, which spreads the matrix multiplication across multiple nodes in a cluster. The P21a matrix is distributed row-wise, and blocks of P22, grouped by rows, are calculated on separate compute nodes. This simple parallel scheme avoids the main bottleneck of storing the largest matrix on a single node, and permits larger MINs to be generated.

As a test of the HPC MIN processing system, we replicated the study described in Dolloff's 2010 Publications (Dolloff, J., and R. Settergren (2010), "WorldView-1 Stereo Extraction Accuracy with and without MIN Processing", Proceedings from the ASPRS Annual Conference, San Diego Calif., Apr. 26-Apr. 30, 2010 and Dolloff, J., and R. Settergren (2010), "An Assessment of WorldView-1 Positional Accuracy based on 50 Contiguous Pairs of Stereo Imagery", J. of Photogrammetric Engineering & Remote Sensing (PE&RS), Vol. 76, No. 8, August 2010), the contents of each of which are incorporated herein by reference. This study was an assessment of a MIN built using 50 overlapping stereo pairs of high-resolution, panchromatic imagery captured by the DigitalGlobe WorldView-1 satellite. This data, along with 107 survey GCPs, was provided to BAE by DigitalGlobe for the purposes of the study (about 90 of the checkpoints were inside the area covered by the image footprints). The imagery covered a roughly 50,000 km area of the western United States, including the Edwards, Fallon, and Nellis Air Force Bases (for brevity, we will refer to it as the "Edwards AFB study").

Figure 8:
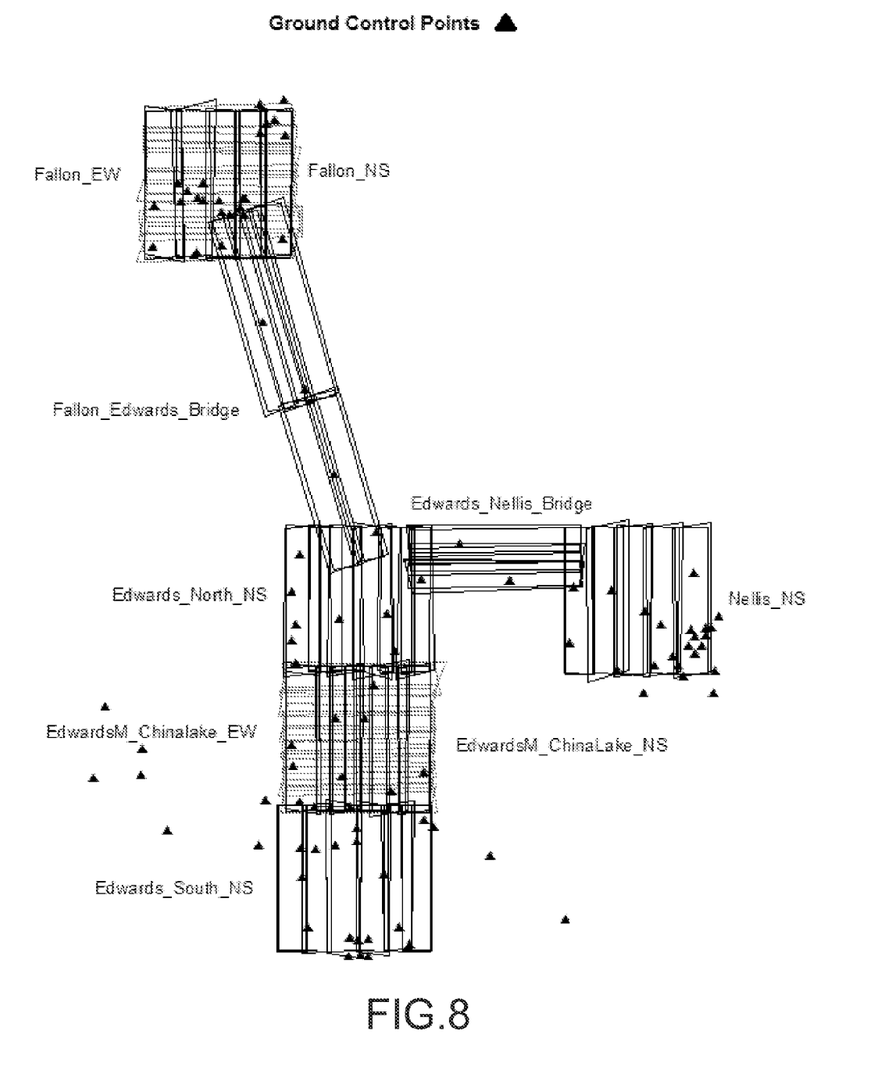
FIG. 8 is an example of a Ground Control (or MIN) network over portions of the western U.S.

The layout of the imagery, together with the locations of all of the DigitalGlobe-provided GCPs, is shown in FIG. 8. The makeup of the image set, which includes East-West acquisitions over two geocells also covered by North-South strips and over a bridging strip to the Nellis geocell, is described in detail in Dolloff's 2010 publications.

In its study, BAE utilized 50 of the DigitalGlobe-provided GCPs as checkpoints, together with an additional 51 checkpoints from other sources. These additional checkpoints were not available to Dig italGlobe for the current study. We therefore used as checkpoints only the 50 GCPs that were both provided by DigitalGlobe, and utilized by BAE. The distribution of the a priori accuracies of these tie points are shown in Table 1. The CE90 (Circular Error, 90% confidence) ranges are used to bin the points for counting, and the LE90 (Linear Error, 90% confidence) column shows the ranges of LE90 for points in each bin.

TABLE 1

Distribution of prior accuracies of the 50 checkpoints

| Number of points | CE90 range (m) | LE90 range (m) |
| --- | --- | --- |
| 23 | <=.25 | <=.3 |
| 14 | >.25, <=.5 | >.3, <=.8 |
| 13 | >.5, <=.7 | >.6, <=1.2 |

A major feature of the DigitalGlobe HPC MIN implementation is that the tie point calculation process is fully automated. The only manual step in image measurement determination is the measurement of survey GCPs into the imagery, using Socet Set, to serve as checkpoints. 4686 tie points, of which 4636 were derived fully-automatically using the ATP system, were used in this study. In production, these point sets would be reviewed and possibly modified for quality control; but for the purpose of this study, which was intended to measure the performance of the fully automated system, they were quickly reviewed but not modified. It should be understood, that the system could run fully automatically, or could be run with manual review of tie points. This manual review would allow the operator to discard tie points that do not lie on repeatable features (for examples, tie points on the edges of shadows).

ATP and MIN Processing Details

The DigitalGlobe HPC MIN implementation is designed to build MINs on a continental scale; the size of the MIN we can build increases indefinitely with the number of nodes and cores we can throw at the problem. There is no theoretical upper bound to the number of points the DigitalGlobe HPC system can handle; however, in practice, on the storage system we use (a 549 TB Isilon storage system over NFS, which is not high-performance storage), we find ourselves bound by file I/O as our MINs get larger, which reduces our ability to take advantage of multithreading and distributed processing. However, MINs such as this one, on the scale of 4000-5000 points, are small for the current system.

All of the ATP processing for the Edwards AFB study was done on two small clusters of Dell R815 (6 nodes) and Dell 720 (8 nodes) servers. Each Dell R815 server has 4 AMD Opteron 6174 2.2 Ghz 12-core processors (48 cores total) with 256 GB RAM, while each Dell 720 has 4 Intel E5-2690 2.9 Ghz 8-core processors (32 cores total) also with 256 GB RAM. The distributed and parallel processing in ATP is implemented using MPI.

For this run, 19,316 quadkeys were processed containing between 1 and 6 overlapping stereo pairs. The total number of interest points generated for these quadkeys in initial processing is over 732 million. These are filtered and combined to form 860,000 tie point sets, which are ranked and filtered down to 17,000 tie points. These tie points are subsampled to form the final set of 4686 points that are used in MIN update processing. The total (wall clock) time required for ATP processing was roughly 28 hours.

Stages 1 and 2 processing were done on the Dell R815 cluster. All of the processing for Stages 1 and 2 occurred on a single core of one server. While our Stage 1 and 2 code is multi-threaded, it is more efficient to run the small problems from earlier updates on a single core because there is slight overhead associated with multithreaded execution over so many cores, which can produce slower overall times initially. We have not yet experimented with optimizing multithreaded performance over multiple cores, but that is expected to significantly decrease the time associated with massive MINs. Additional optimizations with file I/O are expected to further improve performance.

The 49 updates of Stages 1 and 2 for Edwards AFB took a total of 3.72 hours, which averages 4.5 minutes per update. When excluding the final update, which combined existing MIN points from across the region for a fully dense block adjustment and took over an hour, the average time per update was 3.2 minutes. By comparison, results published in Dolloff's 2010 Publications for the same area reported about one minute per update on a different computer. Our updates have approximately 3.5 times as many points per update, which would increase the time proportionally more than that.

Wall clock time for both stages is superlinear in the number of points (it is difficult to say precisely, but algebra and storage of key matrices is quadratic in the number of points). One would expect that if we doubled the number of points in the updates, it would take more than twice as long to finish.

Indeed, if we were to run with the same number of points as in the experiment in Dolloff's 2010 Publications, in which there are 3.5 times fewer points, our last stage 2 update would take roughly a twelfth of the time.

As the updates progress and the number of MIN points grows, the time for stage 2 increases. However, for this particular MIN, even in the later updates, the bulk of the time is spent in the bundle adjustment. It would take many more updates for stage 2 to surpass the time of the bundle adjustment. That is the point at which our distributed parallel, multi-threaded HPC pipeline is expected to deliver superior performance.

At the end of the MIN Processing, a CFG file is created. This CFG file contains adjusted sensor parameters such as $0^{th}$-order roll, pitch, and yaw, and $1^{st}$-order roll and pitch. The adjusted sensor parameters can be used by the orthorectification process for images that are subsequently captured.

The disclosed techniques provide several advantages over the prior art. First, there is the fact that previous methods had always manually selected tie points (GCPs), while the methods described herein can be fully automatic. This allows MINs to be created much more quickly. It makes it more practical to create new MINs in areas where MINs already existed, or to update a MIN, or to expand a MIN. Various reasons may cause one to create a new MIN in an area where a MIN was already in place—seasons, construction, storms/tsunamis/earthquakes, and the like.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. A method of selecting Ground Control Points (GCPs) for a geodetic network, comprising:
    receiving more than one image of a given area on the ground;
    detecting interest points in each image and generating an interest point descriptor and a geo-location for each interest point;
    clustering the interest points based on geo-location to create clusters of interest points; comparing the interest point descriptors for the interest points within each cluster;
    grouping at least some of the interest points based on the comparison;
    and selecting certain groups as GCPs; wherein the selected GCPs are from a set of images where every image in the set overlaps at least a portion of another image in the set, each one of the plurality of GCPs having a geo-coordinate where the GCP is located in the image and each one of the plurality of GCPs having an error covariance that exist between that one of the plurality of GCPs and every other GCP, wherein the plurality of GCPs form a geodetic network; and further including receiving additional information about the geo-coordinate of one or more of the GCPs; and after receiving the additional information, updating the geo-coordinate and error covariance of each GCP in the network, wherein the updating is performed without inline image processing.

2. A method as defined in claim 1, further including generating one or more additional GCPs, each one of the one or more additional GCPs having a geo-coordinate where the GCP is located in the image and each one of the one or more additional GCPs having a error covariance that is exist between that one of the one or more additional GCPs and every other GCP.

3. A method as defined in claim 1, wherein one or more of the GCPs are identified from an automated tie pointing process.

4. A method as defined in claim 1, wherein the updating operation includes bundle adjustment.

5. A method as defined in claim 4, wherein the bundle adjustment adjusts each of the geo-coordinates and generates an error covariance between each of the geo-coordinates.

6. A method as defined in claim 1, wherein the ground control points are generated from satellite or aerial images of the ground by an imaging system that can determine the geo-coordinate of locations in the image.

7. A method as defined in claim 1, wherein the geo-coordinates are expressed in a three-dimensional coordinate system.

8. A method as defined in claim 1, wherein the generating operation includes clustering interest points based on geo-location.

9. A method as defined in claim 8, wherein the generating operation includes comparing interest point descriptors for interest points within each cluster.

10. A method as defined in claim 8, wherein the generating operation is performed without human intervention.

11. A method of selecting Ground Control Points (GCPs) for a geodetic network, comprising:
    with a computer, receiving more than one photographic image of a given area on the ground;
    with a computer, detecting interest points in each photographic image and generating an interest point descriptor and a geo-location for each interest point;
    with a computer, clustering the interest points in the more than one photographic image based on geo-location to create clusters of interest points, wherein at least one of the clusters includes at least one interest point from a first one of the more than one photographic image and at least one interest point from a second one of the more than one photographic image;
    with a computer, comparing the interest point descriptors for the interest points within each cluster;
    with a computer, grouping at least some of the interest points based on the comparison;
    with a computer, selecting certain groups as GCPs;
    further storing image data and geo-location information about each ground control point in a tie point database; and
    performing a sequential fusion of block adjustments from the tie point database, without performing inline measurement of ground control points into new imagery.

12. A method of selecting Ground Control Points (GCPs) for a geodetic network, comprising:
    receiving more than one image of a given area on the ground;
    detecting interest points in each image and generating an interest point descriptor and a geo-location for each interest point;
    clustering the interest points based on geo-location to create clusters of interest points;
    comparing the interest point descriptors for the interest points within each cluster;

grouping at least some of the interest points based on the comparison; and selecting certain groups as GCPs;

further storing image data and geo-location information about each ground control point in a tie point database; and performing a sequential fusion of block adjustments from the tie point database, without performing inline measurement of ground control points into new imagery;

wherein the first time that the block adjustment is performed, the method includes:

specifying the images from the set S that are to be used in the first block adjustment;

using solely the information and data in the tie point database to perform the block adjustment, without the use of any inline image processing, in order to adjust the geo-locations of the ground control points and generate posterior covariances between each of the ground control points; and storing the adjusted ground control point geo-locations, and their posterior covariances, in a ground control network database.

13. A method as defined in claim 12, wherein subsequent times that the block adjustment is performed, the method includes:

specifying the images to be used in the current block adjustment;

using solely the information and data in the tie point database to perform the block adjustment, without the use of any inline image processing, in order to adjust the geo-locations of the ground control points and generate posterior covariances between each of the ground control points; and storing the adjusted ground control point geo-locations, and their posterior covariances, in the ground control network database.

14. A method as defined in claim 11, wherein the generating ground control points operation includes collecting image observations from the set S of imagery by first grouping image observations together according to the geographic area in which the observations are found, and then processing the grouped image observations in parallel on one or more computers to find groups of tie points.

\* \* \* \* \*